Sept. 6, 1966   E. N. KRESGE   3,271,477
GRAFTED TERPOLYMERS
Filed Nov. 4, 1963
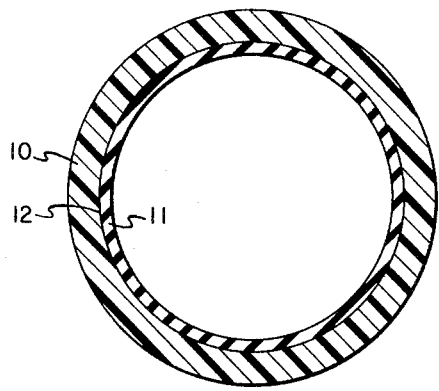
EDWARD N. KRESGE   INVENTOR
BY *R. D. Manahen*
PATENT ATTORNEY

United States Patent Office 3,271,477
Patented Sept. 6, 1966

3,271,477
GRAFTED TERPOLYMERS
Edward N. Kresge, Elizabeth, N.J., assignor to Esso Research and Engineering Company, a corporation of Delaware
Filed Nov. 4, 1963, Ser. No. 321,311
18 Claims. (Cl. 260—877)

This invention relates to graft polymers that can be readily sulfur-cured to form highly useful elastomers. More particularly, the invention is directed to oil resistant graft polymers of ethylene, a $C_3$ to $C_{10}$ alpha olefin, and a non-conjugated diolefin terpolymer.

Rubbery terpolymers of ethylene, a $C_3$ to $C_{10}$ alpha olefin, and hydrocarbon non-conjugated diolefins are very important synthetic materials today because these high molecular weight elastomers are capable of being sulfur-cured to form strong, resilient elastomeric vulcanizates with outstanding weatherability. Additionally, the raw materials used for their formation are commercially available to very low cost. Unfortunately, these terpolymers cannot be used to their fullest commercial extent because they are greatly swollen upon contact with hydrocarbon oils and solvents.

Numerous methods have been proposed in the art for grafting various monomers onto saturated polymers to alter the physical properties of the polymer. Heretofore, it was believed that grafting operations were limited to saturated and highly unsaturated polymers for it was thought that in grafting monomers onto relatively low unsaturation polymers all or a predominance of the desired sites of unsaturation on the polymer necessary for the sulfur vulcanization of the polymer after grafting would be reacted and effectively removed by the grafting process, especially if an ozone-promoted oxidation was utilized to form grafting sites.

It is, therefore, an object of this invention to provide a new graft hydrocarbon elastomer that can be readily sulfur-cured and is resistant to solvent and oil degradation. Other objects will become apparent in the following description and claims.

Now, it has been unexpectedly found that an ozone-initiated hydroperoxidation reaction can be used under certain conditions to form grafting or reactive sites on an unsaturated polymer without reacting to any appreciable extent the double bonds of the terpolymer while normally, as indicated by Bailey's article in Chemical Reviews (The Reactions of Ozone With Organic Compounds, vol. 58, page 925 et seq.), one expects that ozone will readily react with double bonds to form ozonides, thereby destroying the double bonds.

In accordance with this invention, rubbery, grafted, unsaturated terpolymers that are resistant to solvent and oil degradation following vulcanization are prepared by grafting a polar, free radical polymerizable monomer or comonomers to the backbone of a pendently unsaturated terpolymer of ethylene, a $C_3$ to $C_{10}$ alpha monoolefin, and a non-conjugated diolefin.

The nature and objects of the invention will be better understood when reference is made to the accompanying drawing which is a cross-sectional view of a pipe lined with the graft terpolymer of the present invention.

The novel grafted terpolymers of the present invention are prepared by hydroperoxidizing an unsaturated terpolymer of ethylene, a $C_3$ to $C_{10}$ alpha olefin, and a non-conjugated diolefin with a mixture of oxygen and ozone in the presence of a non-polar solvent at elevated temperatures. An inert gas purge is used to sweep out the unreacted oxygen and ozone before the grafting reaction is undertaken. Grafting is achieved by decomposing the hydroperoxide sites on the terpolymer chain with a redox promoter, under conditions such that free radicals are formed on the polymer chain, in the presence of one or more ethylenically unsaturated monomers capable of being polymerized by a free radical mechanism. The grafting operation is characterized by the use of relatively high monomer concentrations and relatively short reaction times to prevent cross-linking of the grafted terpolymer.

Representative examples of the useful $C_3$ to $C_{10}$ alpha olefins are: propylene; 1-butene; 4-methyl-1-pentene; 1-pentene; 1-hexene; 1-heptene; 1-octene; 1-nonene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 6-methyl-1-heptene; 4,4-dimethyl-1-hexene; and 5,6,6-trimethyl-1-heptene, with propylene being the preferred alpha olefin. Straight chain and cyclic non-conjugated hydrocarbon diolefins having from 6 to 15 carbon atoms such as dicyclopentadiene; tetrahydroindine; 5-methylene-2-norbornene; 5-vinyl-2-norbornene; 5(3'-butene)-2-norbornene; 2-methyl-norbornadiene; 2,4-dimethyl-2,7-octadiene; 11-ethyl-1,11-tridecadiene; 3 methallyl cyclopentene; 1,4-hexadiene; and 3(2'-methyl-1-propene)cyclopentene are suitable as the third component of the terpolymer; however, 1,4-hexadiene, dicyclopentadiene, and 5-methylene-2-norbornene which give pendent unsaturation, are the preferred third components of the terpolymer to which is grafted at least one free radical polymerizable monomer.

In the terpolymers, the ethylene monomer unit concentration ranges in general from about 20% to about 75% by weight. Terpolymers having more ethylene monomer units tend to be stiff and non-elastomeric. The concentration of $C_3$ to $C_{10}$ alpha olefin monomer units ranges in general from about 15% to about 75% by weight. Copolymers having a higher $C_3$ to $C_{10}$ alpha olefin content are leathery and boardy. The non-conjugated diolefin monomer content should be present in sufficient amount to provide for sulfur curability, i.e., at least about 0.01 gram-moles per hundred grams of terpolymer, while the maximum amount present by weight should be such as not to interfere seriously with the elastic character of the product and the superior resistance of the nearly saturated product to attack by ozone and oxygen during service, i.e., not over about 20% by weight. In most instances, the diolefin content will not be greater than 10% of the total weight of the terpolymer. The method of preparation of the above-named terpolymers is well known to the art. Specifically, U.S. 3,000,866, U.S. 3,093,621, and U.S. 2,933,480 disclose methods for the formation of sulfur-curable terpolymers and their teachings are herein incorporated by reference.

The terpolymer hydroperoxides used in the preparation of the graft polymers in accordance with this invention can be prepared in a variety of ways. One method of introducing hydroperoxide groups into the terpolymer chain is by oxidation of the polymer with a gas containing free oxygen. This may be done by passing oxygen or an oxygen-containing gas into the solution of the polymer in an inert diluent. Preferably, the oxidation is carried out in the presence of an ozone initiator. Ozone initiators are particularly preferred rather than other oxidation initiators, such as cumene peroxide or cumene hydroperoxide, in that the ozone initiator can be readily removed by an inert gas purge, whereas non-volatile initiators must be removed using more arduous separation techniques. Failure to remove peroxide or hydroperoxide initiators from the polymer solution will lead to formation of homopolymer during the grafting step. Oxygen-containing gas is contacted with the terpolymer in amounts sufficient to hydroperoxidize at least 0.01% of the total monomer units in the terpolymer mass. However, the number of monomer units that are hydroperoxidized usually ranges from about 0.02 to 2.0% of the monomer units in the terpolymer mass. The amount of oxygen necessary to obtain the above-desired degree of hydroperoxidation is about 0.01 liter of $O_2$ at S.T.P. per gram of terpolymer. In most instances, oxygen is used in excess, being continuously passed through the reaction mixture. The amount of ozone initiator present in the reaction zone varies in the range of from about 0.2 to 40 mg. per liter of oxygen, generally from about 2 to 20 mg. per liter of oxygen, and more usually from about 8 to 12 mg. per liter of oxygen.

As set forth above, the graft polymers of the present invention are prepared by decomposing a polymer hydroperoxide under such conditions as will yield free radical on the polymer chain in the presence of one or more monomers capable of being polymerized by free radical mechanism. Any ethylenically unsaturated monomer or comonomer which polymerizes or copolymerizes by free radical mechanism and which imparts solvent and oil resistant properties to the terpolymers of the present invention may be used to introduce the grafts onto the polymer chain. Examples of monomers which can be utilized are $C_4$ to $C_6$, and more preferably $C_4$ to $C_6$, esters of unsaturated acids such as methyl, ethyl, etc., esters of acrylic, methacrylic, and alpha-chloroacrylic acids, $C_3$ to $C_6$ unsaturated nitriles such as acrylonitrile, methacrylonitrile, etc., $C_2$ to $C_5$ unsaturated halides such as vinyl chloride, vinylidene chloride, etc., $C_4$ to $C_6$ vinyl esters such as vinyl acetate, etc., vinyl ethers, vinyl pyridine, and other vinyl compounds, $C_3$ to $C_6$ allyl compounds such as allyl acetate, allyl alcohol, allyl chloride, methallyl acetate, allyl amine, etc. Other compounds suitable as graft monomers include: ethylene maleate; maleic anhydride; acrylamide; methacrylamide; diethylaminoacrylamide; diethylaminoethyl acrylate; sodium vinyl sulfonate; and $C_5$ to $C_8$ unsaturated silanes.

The monomer concentration in the final grafted terpolymer ranges from about 0.5 to 35 wt. percent of the total polymer, and preferably in the range of from about 15 to 30 wt. percent of the total polymer mixture. In the reaction zone, the ratio of monomer to terpolymer hydroperoxide varies in the range of from about 0.05 to 50 parts by weight of monomer per part of terpolymer hydroperoxide, preferably from about 0.1 to 5 parts by weight of monomer per part of terpolymer hydroperoxide is used, and more preferably from about 0.25 to 1.5 parts by weight of monomer per part by weight of terpolymer hydroperoxide is used. The unreacted monomer is removed by conventional means such as stripping, steam stripping, solvent precipitation of the polymer, etc.

The solvents or diluents used in making the preferred polymers of the present invention are in general any liquid material that is inert to ozone or free radical attack. Nonpolar materials are particularly preferred. Hydrocarbon liquids, such as $C_5$ to $C_{12}$ aliphatic hydocarbons, e.g. n-hexane, n-heptane and isooctane, aromatic and halogenated aromatic solvents such as benzene and chlorobenzene can also be used in the process of the present invention. A suspension or an emulsion of the polymer to be hydroperoxidized in a polar solvent, such as water, may be used as the inert diluent. Solvents such as toluene, cumene, tetralin, and unsaturated hydrocarbons should not be used. The graft terpolymers can be produced in the same solvent as the one used for the polymerization of the base or backbone polymer.

The polymer hydroperoxide that is formed by contacting the terpolymer with an oxygen-containing gas and ozone initiator is decomposed so as to form free radicals on the polymer chain in the presence of the grafting monomer by a redox polymerization system. The undesirable side reaction of homopolymerization (from the homolytic cleavage of the hydroperoxide to a hydroxyl free radical) is avoided by use of metals as activators in the graft polymerization. Any of the activators used in redox polymerization may be used to decompose the polymer hydroperoxide into free radicals. By the term "activator" as used in the specification is meant any of the activators known in the art for use in redox polymerization systems. Activators are in general salts or complexes of metals capable of existing in one or more valence states and which are preferably in a reduced oxidation state. Examples of such activators are cobalt, nickel, vanadium, copper, mercury, chromium, manganese, iron, etc., compounds. Activators are usually the pyrophosphates, sulfides, tallates, naphthenates, acetylacetonates, o-phenanthrolines, cyanides, etc., of the above-named metals. These activators may be used alone or in combination with reducing agents such as acetylacetone, reducing sugars, benzoin, etc. For the purposes of the present invention, oil soluble Fe (II), Fe (III), and Co acetylacetonates in combination with benzoin are preferred. The amount of redox reducing agent used to initiate graft polymerization depends to an extent upon the degree of hydroperoxidation of the terpolymer and the concentration of the terpolymer in the reaction diluent. In operations wherein the hydroperoxidized terpolymer is present to the extent of about 50 grams per liter of reaction, diluent, about 0.5 to 150 mgs. of a material such as Fe (III) acetylacetonate is used per liter of diluent and terpolymer and from 10 to 750 mgs. of a material such as benzoin is also used per liter of reaction diluent and terpolymer. However, in most grafting operations the concentration of metal material will vary in the range of from about 1 to 50 mgs. per liter of reaction diluent and terpolymer while the organic redox agent will generally be present in concentrations in the range of from about 50 to 500 mgs. per liter of reaction diluent and terpolymer.

The hydroperoxidation reaction of the terpolymer with oxygen and ozone should be conducted at a temperature in the range of from about 25 to 200° C., and more preferably at a temperature ranging from 50 to 120° C. Hydroperoxidation reaction temperatures below about 25° C. should not be used as the ozone initiator attacks the sites of unsaturation in the terpolymer destroying the double bonds. The grafting operation should take place at temperatures in the range of from about 0 to 70° C., and more preferably at temperatures in the range of from about 25 to 60° C. At grafting temperatures higher than 70° C., homopolymerization of the added monomer can result by thermal decomposition of the terpolymer hydroperoxide into a radical attached to the polymer backbone and a hydroxyl radical. The hydroxyl radical leads to homopolymer not chemically bonded to the terpolymer.

The pressure under which the hydroperoxidation and grafting reactions are carried out is not critical. For the hydroperoxidation reaction, pressures in the range of 0.25 to 50 atmospheres, and in most instances pressures in the range of from about 1 to 10 atmospheres can be used. The polymer grafting reaction should be carried out under a blanket of an inert gas at pressures substantially the same as those set forth for the hydroperoxidation reaction.

The hydroperoxidation reaction time varies in the range of from about ¼ to 10 hours, and more generally in the range of from about ½ to 2 hours. In grafting operations, depending upon the reaction temperature used, the reaction time will vary in the range of from about ⅛ to 30 hours, and in most instances reaction times range from ½ to 8 hours.

The reaction vessel used for the hydroperoxidation and grafting reactions can be constructed of any material which is inert to the reactants and is capable of withstanding the operating pressures. Reaction vessels made of glass, stainless steel and glass-lined steel are quite satisfactory.

In a typical procedure, a glass recation vessel equipped with thermometer, stirrer, reflux condenser, gas delivery tube, and openings to permit the introduction of liquid reagents, is charged with a $C_5$ to $C_{10}$ aliphatic hydrocarbon solvent and a terpolymer of ethylene, propylene, and 5-methylene-2-norbornene. Agitation is then started and the polymer solvent mixture is heated to a temperature of about 70° C. The hydroperoxidation reaction reagents are then continuously introduced through the gas delivery tube below the liquid surface of the terpolymer hydrocarbon solvent mixture at a rate of about 100 to 300 ccs. per minute. After the hydroperoxidation reagents consisting of oxygen and a minor amount of ozone have been introduced for a period of ½ to 2 hours, the reagent inflow is discontinued. Nitrogen is then passed through the reaction mixture for a period of ½ to 2 hours to remove any unreacted oxygen and ozone from the reaction system. The reaction mixture is then cooled to a temperature ranging from 40 to 50° C. and acrylonitrile, Fe (III) acetylacetonate and benzoin are then introduced into the reaction zone using a dropping funnel to prevent the contamination of the reaction system with atmospheric oxygen. The mixture is then stirred for a period of 2 to 6 hours and the reaction stopped when the concentration of the monomer in the grafted terpolymer is about 15 to 30 weight percent of the total polymer mass. The grafted terpolymer is recovered from the reaction mixture by acetone precipitation or solvent evaporation. The remaining solvent is removed by heating the grafted terpolymer on a roll rubber mill. An antioxidant, such as 2,2'-methylene-bis(6-tert.-butyl-4-methyl phenol) or 4,4'-thiobis(2-tert.-butyl-5-methyl phenol), can be incorporated prior to the drying operation to avoid possible oxidation and degradation of the grafted terpolymer.

The graft terpolymers of this invention are rubbery, elastomeric materials having iodine numbers ranging from 5 to 30, and more usually from about 10 to 15, and exhibit four-minute Mooney viscosities at 212° F. of about 50 to 200 and more generally from about 70 to 150.

The novel grafted terpolymers of this invention are rubbery in nature and may be cured to form highly useful elastomers. Any one of a wide variety of curing procedures may be employed. As stated previously, the copolymers may be readily cured with sulfur; in general, any of the procedures familiar to those skilled in the art of processing natural rubber and butyl rubber are suitable. In addition to sulfur curing, which is preferred, one may employ a free radical cure. In carrying out a free radical cure of grafted terpolymers, it is merely necessary to mix, by standard procedures, a free radical generator such as methyl ethyl ketone peroxide and if desired a free radical accepter such as N,N'-substituted bisacrylamide with the grafted terpolymer and heat until a cure is obtained.

Referring now to the accompanying drawing, a vulcanized graft terpolymer of the type described, such as an acrylonitrile graft of an ethylene/propylene/5-methylene-2-norbornene terpolymer, is utilized as a lining for pipe, e.g. polyethylene pipe, which is susceptible to damage upon contact with solvents and various types of oils. In the drawing, reference numeral 10 designates a pipe. The pipe can be constructed of any suitable material such as for example carbon steel or a polymeric material such as polyethylene, polypropylene, and the like. Inside pipe 10 is interposed a lining 11 of graft terpolymer vulcanized according to the procedure of Example 1. Numeral 12 designates the interface between pipe 10 and lining 11. Lining 11 can be attached to pipe 10 employing methods well known to the art, for example epoxy base adhesives and cements can be utilized. Alternatively, if the pipe is made of plastic it can be formed around the vulcanized graft terpolymer lining utilizing known extrusion techniques. When employing the solvent and oil resistant terpolymers of the present invention as linings for metallic conduits, many different techniques can be used to attach the lining to the inside of the conduit. One method employs the use of adhesives wherein a ⅟₁₆ to ½ inch terpolymer lining is sulfur vulcanized while positioned immediately adjacent to the inner periphery of the conduit at temperatures of 300° C. to 350° F. for 10 to 60 minutes. The terpolymers may additionally be employed in the preparation of tires, inner tubes, hose and tubing, jacketing material for wires and cables, and a wide variety of coated or molded articles. In addition to solvent and oil resistant characteristics, the polymers exhibit outstanding thermal stability and excellent resistance to ozone.

This invention and its advantages will be better understood by reference to the following examples:

*Example 1*

Into a three-necked, 2 liter resin flask fitted with a thermometer, stirrer, reflux condenser, gas inlet and outlet tubes, and an opening to permit the introduction of liquid reagents, was charged at room temperature 33 grams of ethylene/propylene/5-methylene-2-norbornene terpolymer in 1 liter of normal heptane. The terpolymer introduced into the reaction zone consisted of 54 wt. percent ethylene, 42.6 wt. percent propylene and 3.4 wt. percent 5-methylene-2-norbornene. The reaction flask and its contents were brought to a temperature of 70° C. with stirring. The gaseous hydroperoxidation reagents were then introduced through the gas inlet tube below the normal heptane-terpolymer liquid surface to supply oxygen and ozone to the system at a rate of 200 ccs. per minute. The ozone concentration in the gaseous reagent was 10 mgs. of ozone per liter of oxygen introduced into the reaction zone. The flow of gaseous hydroperoxidation reagents was maintained for a period of 60 minutes. Upon completion of the introduction of the hydroperoxidation reagents gaseous nitrogen was passed through the reaction mixture for a period of 1 hour to remove any unreacted oxygen and ozone from the reactant solution. Following the completion of the nitrogen purge operation, the reactant solution was tested and was found to contain a hydroperoxide concentration of 2.18 millimoles per liter. A standard procedure for hydroperoxide determination was used. This involves reacting the hydroperoxides with an excess of potassium iodide to yield free iodine. The iodine is then titrated with a standard solution of potassium thiosulfate using a starch indicator.

Following the hydroperoxidation reaction, the reaction vessel was pressurized with nitrogen and the grafting reagents introduced into the reaction zone. The grafting reagents consisted of 33 mls. of acrylonitrile, 13.3 mgs. of iron (III) acetylacetonate, and 133 mgs. of benzoin. The reaction mixture was stirred for a period of 4 hours while the reaction zone and its contents were maintained at a temperature of about 50° C. The catalyst was then deactivated and the grafted polymer precipitated by adding several liters of acetone to the reaction mixture. The resulting precipitated grafted terpolymer was then washed and drum dried giving 37.3 grams of a soft attractive elastomer containing about 11.6 wt. percent grafted acrylonitrile.

Infrared spectra of a film of the elastomer indicated absorption at wave lengths that may be recognized as coming from the grafted acrylonitrile. Further, all of the infrared absorption characteristics of ethylene/propylene/5-methylene-2-norbornene terpolymer was found illustrating that the double bonds present were not destroyed by the hydroperoxidation or grafting of the polymers. Iodine numbers were also determined for the graft polymer and showed that the relatively small amount of unsaturation present in backbone polymer was retained in the grafted terpolymer.

Further tests were conducted to determine whether a true graft terpolymer was formed rather than a mixture of terpolymer and homopolymerized acrylonitrile. The tests were affected by extracting the acrylonitrile grafted terpolymer with dimethylformamide which is known to be a solvent for polyacrylonitrile. Only a small portion of the polymer corresponding to less than 0.5% by weight of the total polymer was found to be soluble. Nitrogen analysis of the dimethylformamide soluble material indicated that it is highly grafted terpolymer rather than polyacrylonitrile. The insolubility of the bulk of the grafted terpolymer illustrates that the acrylonitrile chains are chemically bonded to the starting polymer and is thus a true graft polymer and not a mixture of the acrylonitrile homopolymer and ethylene/propylene/5 - methylene - 2-norbornene terpolymer.

Ten grams of the above grafted terpolymer was compounded on a rubber roll mill with 6 grams of semi-reinforcing furnace black, 0.5 gram of zinc oxide, 0.1 gram of stearic acid, 0.2 gram of sulfur, 0.1 gram of tetramethylthiurium disulfide, and 0.05 gram of mercaptobenzothiazole. The stock obtained was heated at 307° F. for 10 minutes in a mold to give cured rubbery slabs 5″ x 1″ x 0.08–0.10″. They were subsequently cut into standard dumbbells and tested at 25° C. with a Scott, model L–5, tensile tester. Additionally, the vulcanizate was subjected to a Shore A hardness test as covered by ASTM Method D–676–49T. The vulcanizate displayed the following properties: Shore A hardness, 77; modulus at 100% extension, 1100 p.s.i.; tensile strength, 2350 p.s.i.; elongation at the break, 290%.

*Example 2*

The procedure of Example 1 was repeated except that 33 grams of an ethylene/propylene/1,4-hexadiene terpolymer was substituted for the 33 grams of ethylene/propylene/5-methylene-2-norbornene called for; and the hydroperoxidation reaction time was 30 minutes instead of 60 minutes. The terpolymer used in this test consisted of 59 wt. percent ethylene, 37.4% propylene and 3.6% 1,4-hexadiene. The grafted terpolymer obtained weighed 37.0 grams and contained 10.8 wt. percent of acrylonitrile. The grafted terpolymer was cured and tested by the same procedure described in Example 1 above. At 25° C., the vulcanizate displayed a Shore hardness of 81; modulus at 100% extension, 1130 p.s.i.; tensile strength, 2430 p.s.i.; elongation at the break, 200%.

*Example 3*

The procedure of Example 1 was repeated except that 33 grams of an ethylene/propylene/dicyclopentadiene was substituted for the 33 grams of an ethylene/propylene/5-methylene-2-norbornene called for. The terpolymer used in the grafting procedure consisted of 70 wt. percent ethylene, 19 wt. percent propylene, and 11 wt. percent dicyclopentadiene. The copolymer obtained weighed 37.1 grams and contained 11.2 wt. percent acrylonitrile. It was cured and tested by the same procedure described in Example 1 above. At 25° C., the vulcanizate displayed a Shore hardness of 78; modulus at 100% extension, 510 p.s.i.; tensile strength, 2390 p.s.i.; elongation at the break, 410%.

*Example 4*

The procedure of Example 1 was repeated except the terpolymer was grafted with 16.7 grams of methyl methacrylate and 40 grams of acrylonitrile as comonomers. The grafted terpolymer obtained weighed 41.5 grams and contained 8.4 wt. percent of methyl methacrylate and 13.7 wt. percent of acrylonitrile. The concentration of methyl methacrylate was determined from oxygen analysis. The polymer was cured and tested by the same procedure described in Example 1 above. At 25° C., the vulcanizate displayed a Shore hardness of 80; modulus at 100% extension, 790 p.s.i.; tensile strength, 2250 p.s.i.; elongation at the break, 220%. This example indicates that the graft may consist of a mixture of monomers that will copolymerize under free radical initiation to yield polymeric materials.

*Example 5*

The volume swell characteristics of a sulfur-cured terpolymer consisting of 55 wt. percent ethylene, 40.7 wt. percent propylene, and 4.3 wt. percent 5-methylene-2-norbornene containing varying amounts of grafted acrylonitrile and cured for varying amounts of time are listed in Table I below. The terpolymer samples used in the volume swell measurements were compounded according to the following recipe: 100 parts by wt. terpolymer, 60 parts semi-reinforcing furnace black, 5 parts zinc oxide, 1 part stearic acid, 2 parts sulfur, 1 part tetramethylthiurium disulfide, and 0.5 part mercaptobenzothiazole. The mixture was then heated at a temperature of 307° F. for a period of time listed in the table. The technique used to obtain the percent volume swell measurements corresponds to ASTM Method D–471–55T. Utilizing the ASTM method, a weighed sample of polymer is immersed in fuels and solvents for a period of 70 hours at a temperature in the range of from about 70 to 75° F. In tests wherein an oil is used as the test material, a weighed sample of polymer is immersed in oil for a period of 70 hours at a temperature of 212° F.

TABLE I

| Sample No. | Acrylonitrile in Polymer, wt. percent | Cure Time, min. | Shore A Hardness | 100% Modulus, p.s.i. | Tensile Strength, p.s.i. | Elongation, percent | Percent Volume Swell | | | | |
|---|---|---|---|---|---|---|---|---|---|---|---|
| | | | | | | | Benzene | Fuel A [1] | Fuel B [2] | ASTM #3 Oil [3] | MEK |
| 1 | | 5 | 70 | 270 | 2,610 | 685 | 178 | 143 | 291 | 328 | 11 |
| 2 | | 10 | 73 | 360 | 2,100 | 480 | 130 | 116 | 186 | 243 | 10 |
| 3 | | 15 | 74 | 430 | 2,300 | 425 | | 108 | 128 | 206 | 10 |
| 4 | | 25 | 76 | 550 | 2,300 | 320 | 120 | 101 | 131 | 182 | 10 |
| 5 | 25 | 5 | 80 | 520 | 1,910 | 300 | 85 | 63 | 110 | 161 | 9 |
| 6 | 25 | 10 | 81 | 640 | 2,180 | 265 | 72 | 56 | 87 | 130 | 7 |
| 7 | 25 | 15 | 85 | 730 | 2,000 | 235 | 60 | 50 | 69 | 108 | 7 |
| 8 | 19.3 | 20 | 80 | 1,400 | 2,030 | 150 | | | | 94 | |
| 9 | 23.3 | 20 | 85 | 1,600 | 2,050 | 145 | | | | 98 | |

[1] Fuel A—100 vol. percent isooctane.
[2] Fuel B—70 vol. percent isooctane, 30 vol. percent toluene.
[3] ASTM #3 Oil—Oil combination having an aniline point of 70° C.

From an analysis of the data listed in Table I above, it can be readily seen that the grafted acrylonitrile terpolymer vulcanizates give volume swells that are far superior to the terpolymer vulcanizates that do not contain grafted acrylonitrile. In every instance, grafting of the free radical polymerizable monomer onto the backbone of the terpolymer served to reduce the swelling characteristics of the terpolymer and thus make them more desirable for commercial applications wherein solvent and oil resistance is required. Such applications include conduits, such as ducts, hoses and pipes, wire and cable coatings, seals, molded mechanical goods, motor mounts, shoes, heels, tires, tire products, tank and pipe linings, and other articles of manufacture. Graft terpolymer cements and emulsions make outstanding adhesives for special applications.

Further advantages of this invention will be apparent to those skilled in the art. Grafted terpolymers that exhibit resistance to solvent and oil degradation can be directly prepared by the process of the present invention. It is to be understood that this invention is not

What is claimed is:

1. A grafted terpolymer that is sulfur-curable to an elastomeric, oil and solvent resistant vulcanizate, said grafted terpolymer consisting of a terpolymer having side chains grafted thereon and having been prepared from at least one ethylenically unsaturated free-radical polymerizable monomer grafted to a residually unsaturated terpolymer hydroperoxide, said terpolymer consisting of at least about 20% ethylene by wt., at least about 15% by wt. of a $C_3$ to $C_{10}$ aliphatic alpha olefin, and at least about 0.01 gram-mole per 100 grams of said terpolymer and not over about 20% by wt. of a nonconjugated diolefin.

2. The graft terpolymer of claim 1 wherein said nonconjugated diolefin has from 6 to 15 carbon atoms.

3. The graft terpolymer of claim 1 wherein said nonconjugated diolefin is selected from the group consisting of 5-methylene-2-norbornene, 1,4-hexadiene, and dicyclopentadiene.

4. A graft terpolymer of claim 1 sulfur-cured to an elastomeric, oil and solvent resistant vulcanizate.

5. A grafted terpolymer that is sulfur-curable to an elastomeric, oil and solvent resistant vulcanizate, said grafted terpolymer consisting of a terpolymer having side chains grafted thereon and having been prepared from at least one ethylenically unsaturated free-radical polymerizable monomer grafted to a pendently residually unsaturated terpolymer hydroperoxide, said terpolymer consisting of at least about 20% ethylene by wt., at least about 15% propylene by wt., and at least about 0.01 gram-mole per 100 grams of said terpolymer and not over about 20% by wt. of a diolefin selected from the group consisting of 5-methylene-2-norbornene, dicyclopentadiene, and 1,4-hexadiene.

6. A grafted terpolymer that is sulfur-curable to an elastomeric, oil and solvent resistant vulcanizate, said grafted terpolymer consisting of a terpolymer having side chains grafted thereon and having been prepared from at least one $C_2$ to $C_8$ ethylenically unsaturated free-radical polymerizable monomer grafted to a pendently residually unsaturated terpolymer hydroperoxide, said terpolymer consisting of at least about 20% ethylene by wt., at least about 15% propylene by wt., and at least about 0.01 gram-mole per 100 grams of said terpolymer and not over about 20% by wt. of diolefin selected from the group consisting of 5-methylene-2-norbornene, dicyclopentadiene, and 1,4-hexadiene.

7. The graft terpolymer of claim 6 wherein said free-radical polymerizable compound is about 0.5 to 35% by weight of the total graft terpolymer.

8. A graft terpolymer of claim 5 sulfur-cured to an elastomeric, oil and solvent resistant vulcanizate.

9. The graft terpolymer of claim 6, wherein said graft monomer is selected from the group consisting of $C_4$ to $C_6$ unsaturated esters and $C_3$ to $C_6$ unsaturated nitriles.

10. The graft terpolymer of claim 6, wherein said graft monomer is acrylonitrile.

11. The graft terpolymer of claim 6, wherein said graft monomers are methylmethacrylate and acrylonitrile.

12. The graft terpolymer of claim 6, wherein said diolefin is 5-methylene-2-norbornene and said graft monomer is acrylonitrile.

13. The graft terpolymer of claim 6, wherein said diolefin is 5-methylene-2-norbornene and said graft monomers are methylmethacrylate and acrylonitrile.

14. An article of manufacture made from the vulcanized graft terpolymer of claim 4.

15. An article of manufacture comprising a wire coated with the vulcanized graft terpolymer of claim 4.

16. A conduit comprising the vulcanized graft terpolymer of claim 4.

17. A plastic pipe lined with $\frac{1}{16}$ to $\frac{1}{2}$ inch of the vulcanized graft terpolymer of claim 4.

18. A metallic pipe lined with $\frac{1}{16}$ to $\frac{1}{2}$ inch of the vulcanized graft terpolymer of claim 4.

References Cited by the Examiner

UNITED STATES PATENTS

| | | | |
|---|---|---|---|
| 2,388,905 | 9/1945 | Compagnon et al. | 260—768 |
| 2,837,496 | 12/1952 | Vandenberg | 260—878 |
| 3,076,779 | 2/1963 | Serniuk | 260—879 |
| 3,093,621 | 5/1963 | Gladding | 260—80.5 |

SAMUEL H. BLECH, *Primary Examiner.*

D. J. BREZNER, *Assistant Examiner.*

Notice of Adverse Decision in Interference

In Interference No. 95,973 involving Patent No. 3,271,477, E. N. Kresge, GRAFTED TERPOLYMERS, final judgment adverse to the patentee was rendered Feb. 13, 1969, as to claims 1, 2, 3, 5, 6, 7, 9 and 11.

[*Official Gazette May 6, 1969.*]